United States Patent [19]

Mizukoshi

[11] Patent Number: 5,503,017
[45] Date of Patent: Apr. 2, 1996

[54] SEMICONDUCTOR ACCELERATION SENSOR

[75] Inventor: Masahito Mizukoshi, Nagoya, Japan

[73] Assignee: Nippondenso Co., Ltd., Kariya, Japan

[21] Appl. No.: 246,668

[22] Filed: May 20, 1994

[30] Foreign Application Priority Data

May 21, 1993 [JP] Japan .................................. 5-119638

[51] Int. Cl.$^6$ .................................................. G01P 15/08
[52] U.S. Cl. ........................... 73/514.36; 73/514.16; 73/777
[58] Field of Search ............................ 257/254, 417; 73/777, 514.16, 514.36, 514.01, 514.14

[56] References Cited

U.S. PATENT DOCUMENTS

| | | | |
|---|---|---|---|
| 4,342,227 | 8/1982 | Petersen | 73/514.32 |
| 4,873,871 | 10/1989 | Bai | 73/777 |
| 4,894,698 | 1/1990 | Hijikigawa et al. | 73/724 |
| 5,138,414 | 8/1992 | Shinohara | 73/777 |

FOREIGN PATENT DOCUMENTS

| | | |
|---|---|---|
| 0194953 | 9/1986 | European Pat. Off. . |
| 57-068079 | 4/1982 | Japan . |
| 61-222178 | 10/1986 | Japan . |
| 62-147335 | 7/1987 | Japan . |
| 64-5075 | 1/1989 | Japan . |
| 1-152369 | 6/1989 | Japan . |
| 2-134570 | 5/1990 | Japan . |
| 3-107767 | 5/1991 | Japan . |
| 4-25764 | 1/1992 | Japan . |
| 4-332174 | 11/1992 | Japan . |
| 2-174839 | 11/1986 | United Kingdom . |

*Primary Examiner*—Hezron E. Williams
*Assistant Examiner*—Christine K. Oda
*Attorney, Agent, or Firm*—Cushman, Darby & Cushman

[57] ABSTRACT

A semiconductor acceleration sensor including a trench provided in a main surface of a semiconductor substrate, the trench having a first inner wall, a second inner wall opposite to the first inner wall, and a third inner wall joining the first and second inner walls. A gate electrode faces the first, second and third inner walls of the trench through an air gap. A first semiconductor unit is formed in the first inner wall consisting of three adjoining semiconductor layers for detecting a displacement of the gate electrode relative to the first semiconductor unit induced by an applied acceleration, each of the three adjoining semiconductor layers in the first semiconductor unit having a different conductivity type. A second semiconductor unit is formed in the second inner wall consisting of three adjoining semiconductor layers for detecting a displacement of the gate electrode relative to the second semiconductor unit induced by an applied acceleration, each of the three adjoining semiconductor layers in the second semiconductor unit having a different conductivity type.

7 Claims, 5 Drawing Sheets

SEMICONDUCTOR ACCELERATION SENSOR

BACKGROUND OF THE INVENTION

1. Field of the Invention

The present invention relates to a semiconductor acceleration sensor (SAS), particularly to a FET type SAS advantageously used for automobile air bag systems, antilock brake systems (ABS), etc.

2. Description of the Related Art

Japanese Unexamined Patent Publication (Kokai) No. 4-25764 disclosed a FET type SAS as shown in FIG. 1, in which a FET type SAS 110 comprises a substrate 102 having source and drain regions 103a and 103b formed so as to extend from the surface to the inside of the substrate, a gate insulating film 104 formed on the substrate surface including the source and drain regions 103a and 103b, and a movable gate electrode 101 formed in one end of a cantilever anchored at the other end to the substrate. The gate electrode 101 is sustained above the gate insulating film 104 of the substrate 102 with an air gap 105 left between the bottom of the gate electrode 101 and the gate insulating film 104.

The SAS 110 detects an acceleration to which it is subjected, by detecting a change in the drain current due to a displacement of the movable gate electrode 101 caused by the acceleration, as shown by the double-headed arrow.

However, even when the SAS 110 is not under the influence of an acceleration, the gate voltage generates an electrostatic attractive force acting between the gate electrode 101 and the substrate 102, occasionally causing the former to be undesirably brought into contact with the latter.

To prevent such an undesired contact from occurring, the only possible method which could have been used was either to provide the cantilever 101 with an increased spring constant or to provide the air gap 105 with an increased height. Either method, however, is not recommended because the sensitivity of the SAS would be reduced.

SUMMARY OF THE INVENTION

The object of the present invention is to provide a semiconductor acceleration sensor (SAS) in which a movable gate electrode is prevented from being brought into contact with a substrate by an electrostatic attractive force while a high sensitivity of the SAS is preserved.

To achieve the object according to the present invention, there is provided a semiconductor acceleration sensor comprising:

a trench provided in a main surface of a semiconductor substrate, the trench having a first inner wall, a second inner wall opposite to the first inner wall, and a third inner wall joining the first inner wall and the second inner wall;

a gate electrode of an electroconductive material, the gate electrode facing, via an air gap, the first inner wall, the second inner wall and the third inner wall of the trench;

a first semiconductor unit formed in the first inner wall and consisting of three adjoining semiconductor layers with every adjoining pair thereof having different conductivity types, for detecting a displacement of the gate electrode relative to the first semiconductor unit induced by an applied acceleration; and a second semiconductor unit formed in the second inner wall and consisting of three adjoining semiconductor layers with every adjoining pair thereof having different conductivity types, for detecting a displacement of the gate electrode relative to the second semiconductor unit induced by an applied acceleration.

The semiconductor acceleration sensor may preferably further comprise an electrically insulating film covering the first inner wall, the second inner wall, and the third inner wall.

Typically, the first semiconductor unit extends from the first inner wall to the main surface of the semiconductor substrate and the second semiconductor unit extends from the second inner wall to the main surface of the semiconductor substrate.

There is also provided a semiconductor acceleration sensor comprising:

a trench provided in a main surface of a semiconductor substrate and having a first inner wall, a second inner wall, a third inner wall and a fourth inner wall;

a cantilever supported in the trench, with an air gap left between the cantilever and inner walls of the trench;

a first gate electrode of an electroconductive material provided on one side surface of the cantilever, with an air gap left between the first gate electrode and inner walls of the trench;

a second gate electrode of an electroconductive material provided on the other side surface of the cantilever opposite to the one side surface, with an air gap left between the second gate electrode and inner walls of the trench;

a first semiconductor unit formed in the first inner wall and consisting of three adjoining semiconductor layers with every adjoining pair thereof having different conductivity types, for detecting a displacement of the first gate electrode relative to the first semiconductor unit induced by an applied acceleration;

a second semiconductor unit formed in the second inner wall and consisting of three adjoining semiconductor layers with every adjoining pair thereof having different conductivity types, for detecting a displacement of the first gate electrode relative to the second semiconductor unit induced by an applied acceleration;

a third semiconductor unit formed in the third inner wall and consisting of three adjoining semiconductor layers with every adjoining pair thereof having different conductivity types, for detecting a displacement of the second gate electrode relative to the third semiconductor unit induced by an applied acceleration; and a fourth semiconductor unit formed in the fourth inner wall and consisting of three adjoining semiconductor layers with every adjoining pair thereof having different conductivity types, for detecting a displacement of the second gate electrode relative to the fourth semiconductor unit induced by an applied acceleration.

There is also provided a semiconductor acceleration sensor comprising:

a gate electrode of a electroconductive material formed in a semiconductor substrate with an air gap left between the gate electrode and the semiconductor substrate;

a first semiconductor unit formed in a surface of the semiconductor substrate and consisting of three adjoining semiconductor layers with every adjoining pair thereof having different conductivity types, for detecting a displacement of the gate electrode relative to the first semiconductor unit induced by an applied acceleration; and a potential layer formed in the semiconductor substrate and facing, via an air gap, one side of the gate electrode opposite to the first semiconductor unit, the potential layer having the same electric potential as that of the first semiconductor unit.

Typically, the potential layer is a second semiconductor unit consisting of three adjoining semiconductor layers with every adjoining pair thereof having different conductivity types.

It should be noted that the present invention also provides a semiconductor displacement sensor comprising:

a trench provided in a main surface of a semiconductor substrate, the trench having a first inner wall, a second inner wall opposite to the first inner wall, and a third inner wall joining the first inner wall and the second inner wall;

a gate electrode of an electroconductive material, the gate electrode facing, via an air gap, the first inner wall, the second inner wall and the third inner wall of the trench;

a first semiconductor unit formed in the first inner wall and consisting of three adjoining semiconductor layers with every adjoining pair thereof having different conductivity types, for detecting a displacement of the gate electrode relative to the first semiconductor; and a second semiconductor unit formed in the second inner wall and consisting of three adjoining semiconductor layers with every adjoining pair thereof having different conductivity types, for detecting a displacement of the gate electrode relative to the second semiconductor unit.

The semiconductor acceleration sensor according to the present invention comprises a movable gate electrode disposed in a trench provided in a semiconductor substrate, a first semiconductor unit formed in a first side surface of the trench and consisting of three adjoining semiconductor layers with every adjoining pair thereof having different conductivity types, and a second semiconductor unit formed in a side surface of the trench opposite to the first side surface and consisting of three adjoining semiconductor layers with every adjoining pair thereof having different conductivity types.

This structure can cancel an electrostatic attractive forces acting between the movable gate electrode and the semiconductor units, respectively, while ensuring a good sensitivity, when operated with an applied voltage between the movable gate electrode and the semiconductor units.

DESCRIPTION OF THE PREFERRED EMBODIMENTS

EXAMPLE

A preferred embodiment of the present invention will be described in detail with reference to the attached drawings.

Figure 1:
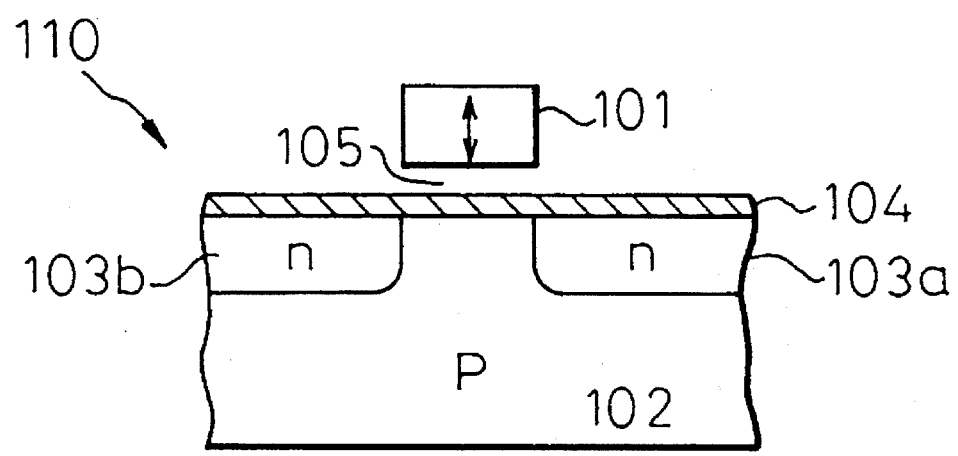
FIG. 1 shows a conventional FET type semiconductor acceleration sensor (SAS), in a sectional view.
Figure 2A:
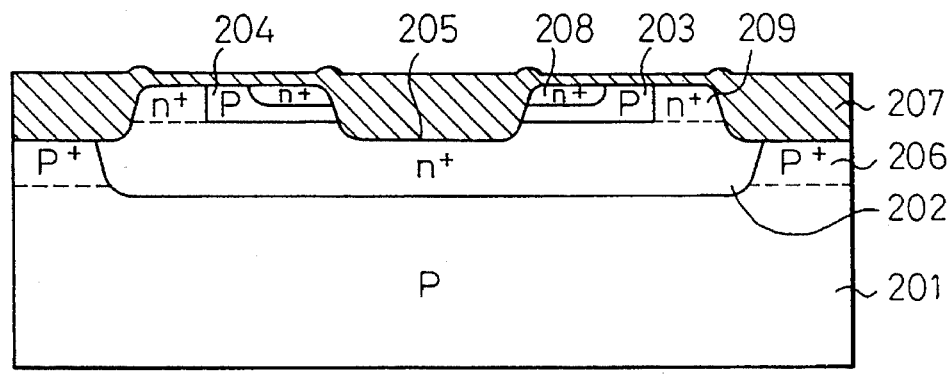
FIGS. 2(a), 2(b) and 2(c) show an example of the process steps of producing a SAS according to the present invention, in sectional views.
Figure 2B:
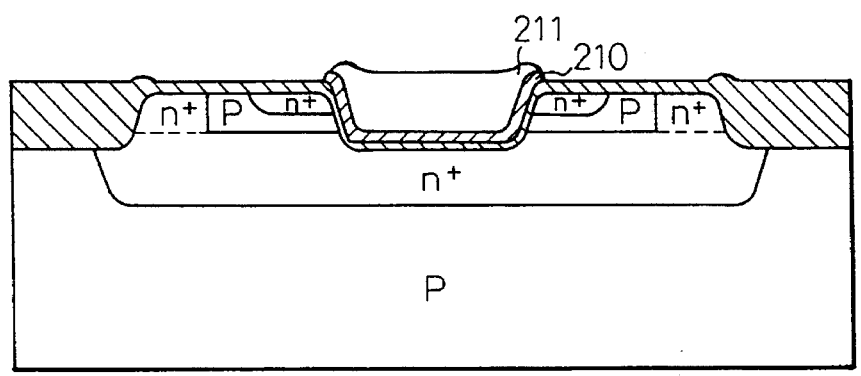
Figure 2C:
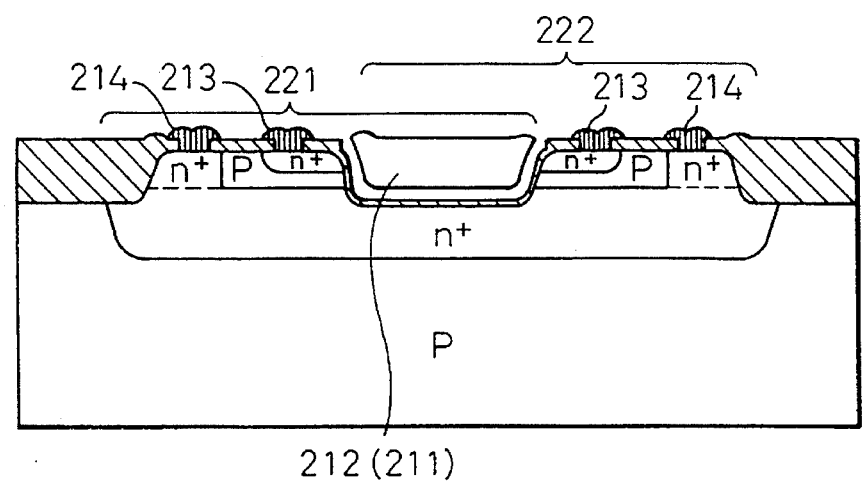

FIGS. 2(a), 2(b) and 2(c) show an example of the process steps for producing a SAS according to the present invention.

Referring to FIG. 2(a), a high concentration $N^+$ type imbedded layer 202 is formed in a P type silicon substrate 201 and a P type epitaxial layer 203 is then formed on the substrate 201. The epitaxial layer 203 is patterned by partial etching to form a FET region 204 and a trench region 205. A high concentration of a P type impurity is diffused into the exposed portion of the substrate 201 other than the trench region 205 to form a channel stopper layer 206. Thereafter, the epitaxial layer 203 is thermally oxidized to form a LOCOS oxide layer 207 covering the FET region 204. An impurity diffusion process is carried out twice to form a high concentration N type impurity diffused region which provides a source region 208 and a drain region 209. At this stage, the side surface of the FET region or unit 204 that forms one of the side walls of the trench 205 is defined by the exposed source region 208, P type epitaxial layer 203 providing a channel layer, and drain region 209 (or N layer 202) in that order from the top of the FET unit 204.

Referring to FIG. 2(b), after removing the LOCOS oxide film 207 of the trench region 205, an undoped polysilicon layer 210 and a polysilicon layer 211 doped with boron (B) at a high concentration of about $4\times10^{20}$ cm$^{-3}$ are formed in that order over the entire area in which a gate oxide film is to be formed. The undoped polysilicon layer 210 and the B-doped polysilicon layer 211 are then patterned to remain only in the trench region 205.

Referring to FIG. 2(c), the undoped polysilicon layer 210 is then etched with an aqueous solution of TMAH (tetramethylammonium hydroxide) to form a movable gate electrode 212, and thereafter, contact holes are formed and filled with a metal to form metal electrodes 213 and 214, to complete a semiconductor acceleration sensor (SAS) composed of two FETs 221 and 222 having a common gate electrode 212 of undoped polysilicon 211.

Figure 3:
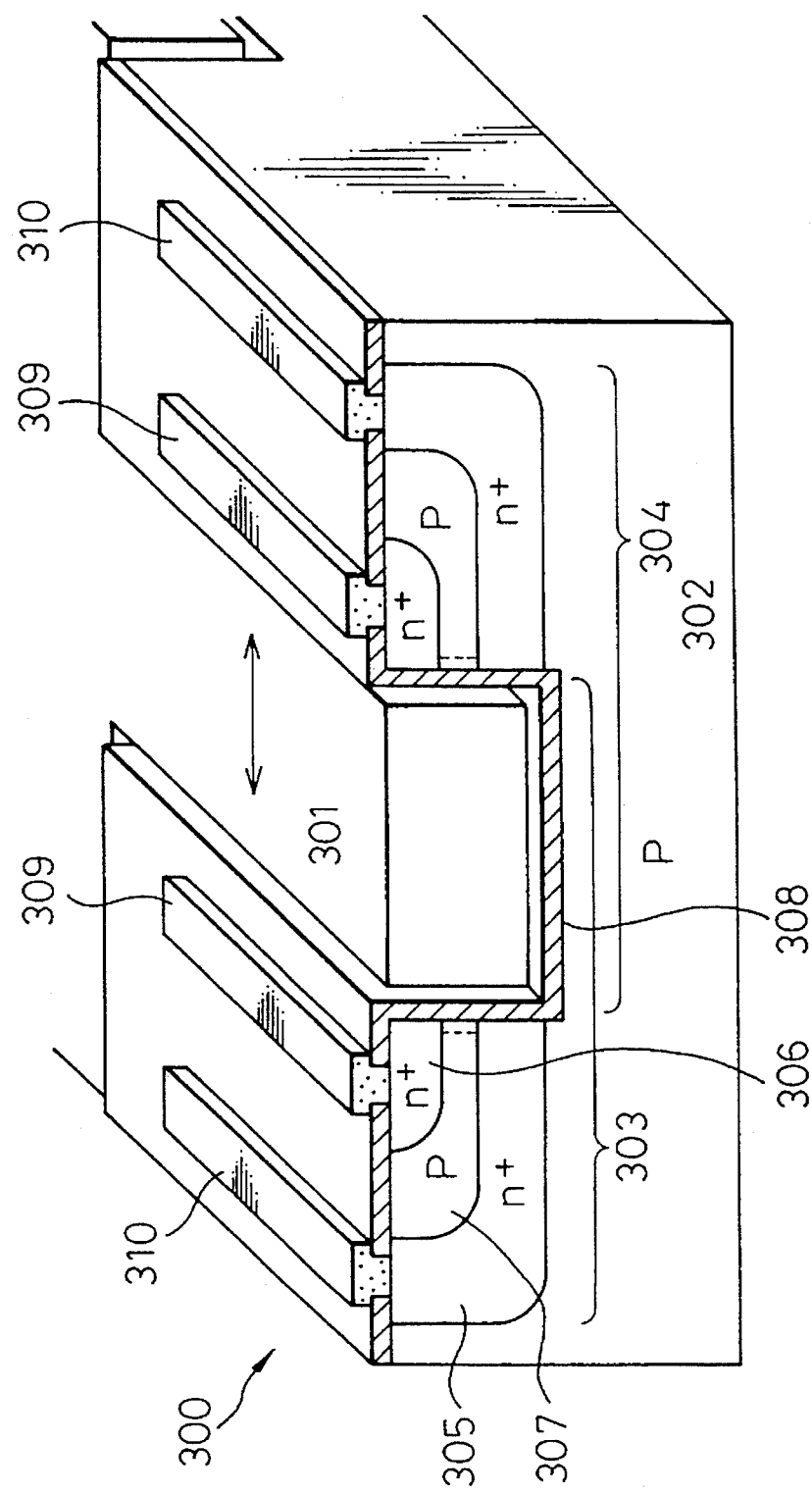
FIG. 3 shows a preferred embodiment of the SAS according to the present invention, in a perspective view.

FIG. 3 shows a principal structure of the thus-produced SAS according to the present invention, in a perspective view, in which a SAS 300 has a movable gate electrode 301 which is moved or displaced in the direction shown by an double-headed arrow when subjected to an acceleration. The SAS 300 includes a P type semiconductor substrate 302, two FETs 303 (FET1) and 304 (FET2), drain, source and channel regions 305, 306 and 307, an insulating film 308, and source and drain electrodes 309 and 310.

The SAS 300 has a pair of FETs 303 and 304 having the same structure, composed by disposing two pairs of source and drain regions 305 and 306 on both sides of the displacement axis of the movable gate electrode 301. In this structure, the movable gate electrode 301 is subjected to the electrostatic attractive forces from the two FETs on both sides, and these attractive forces acting in opposite directions can be cancelled with each other.

Figure 4:
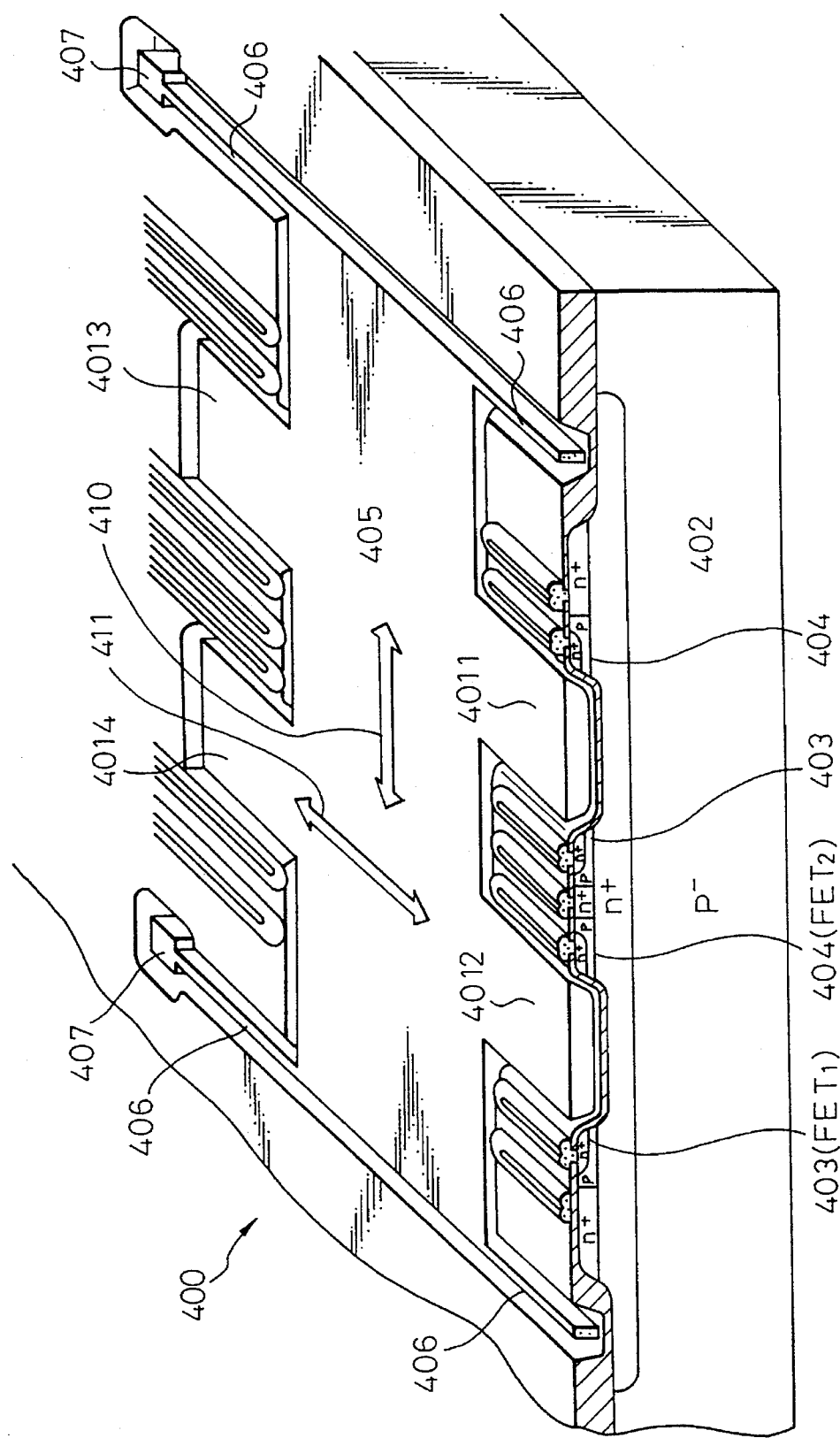
FIG. 4 shows another preferred embodiment of the SAS according to the present invention, in a perspective view.

FIG. 4 shows an arrangement of a SAS according to the present invention produced by using the above-described process, in a perspective view.

The shown SAS 400 has four movable gate electrodes 4011 to 4014, although the number of the movable gate electrodes can be determined in accordance with the design and/or production convenience. The movable gate electrodes 4011 to 4014 are fixed to a semiconductor substrate 402 with anchors 407 via cantilevers 406 and a weight portion 405.

Figure 5A:
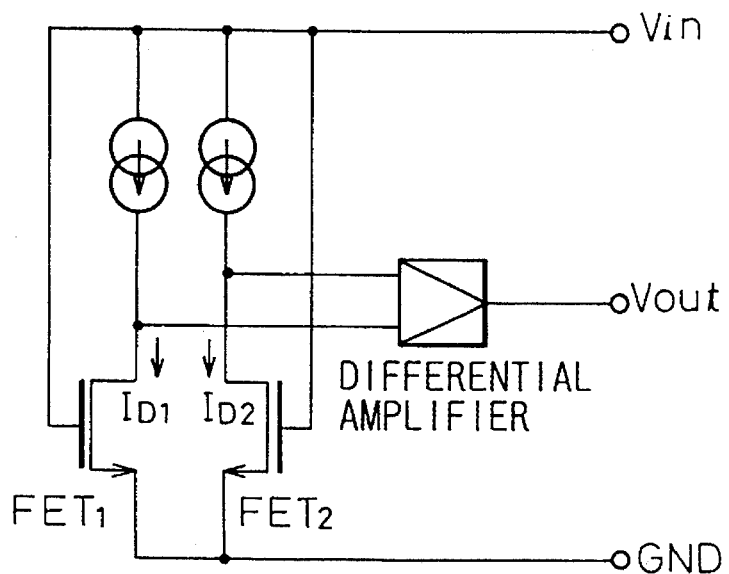
FIGS. 5(a) and 5(b) respectively show (a) an acceleration detection circuit using the SAS shown in FIG. 3 and (b) the characteristic currents of the two FETS (FET1, FET2) of the same SAS.
Figure 5B:
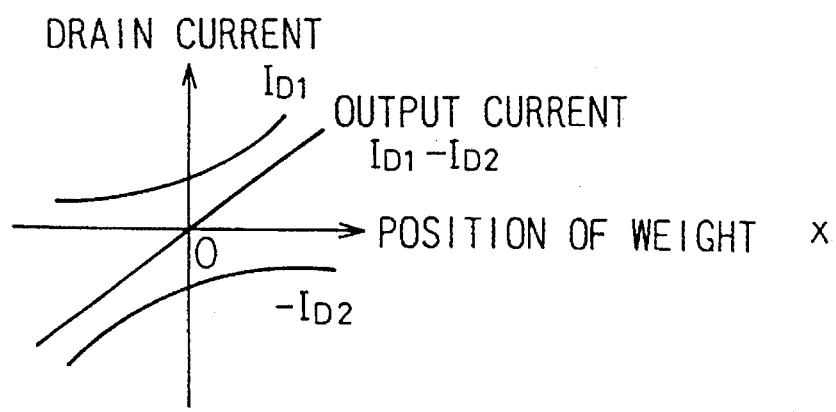

FIG. 5(a) shows a acceleration detection circuit using the SAS 300 shown in FIG. 3. This circuit carries out differential detection of two drain currents of the two FETs 303 and 304, i.e., FET1 and FET2. FIG. 5(b) shows the characteristic currents of FET1 and FET2. The axis of abscissa represents the position of the movable gate electrode in terms of the position of the weight, in which the point "0" indicates that the movable gate electrode remains at a neutral position when no acceleration is applied. The drain currents of FET1 and FET2 are denoted as "$I_{D1}$" and "$I_{D2}$" respectively. A differential measurement of the drain currents $I_{D1}$ and $I_{D2}$ yields a linear output current as shown in FIG. 5(b).

The SAS structure shown in FIG. 4 provides two-dimensional acceleration detection in the following manner.

When the SAS 400 shown in FIG. 4 is subjected to an acceleration acting in the direction of the double-headed arrow 410, the movable gate electrodes 4011 to 4014, together with the cantilevers 406 and the weight 405, are displaced to allow the acceleration in the direction of the arrow 410 to be detected in the movable gate electrode 4012, for example, through a difference between the channel currents flowing in FET1 (403) and FET2 (404), respectively.

When the SAS 400 is subjected to an acceleration acting in the direction of the double-headed arrow 411, comparing the group of the movable gate electrodes 4011 and 4012 with the group of the movable gate electrodes 4013 and 4014, the movable gate electrodes 4011 to 4014 face the corresponding pair of FET1 and FET2 in the different portions, with the result that the channel currents are different between the FETs facing the movable gate electrodes 4011 and 4012 and the FETs facing the movable gate electrodes 4013 and 4014, allowing the acceleration in the direction of the arrow 411 to be detected.

As hereinabove described, the present invention provides a semiconductor acceleration sensor in which first and second semiconductor regions or units are disposed on the opposing side surfaces of a trench containing a movable gate electrode suspended in space to cancel an electrostatic attractive force acting between the movable gate electrode and the semiconductor unit, thereby preventing the movable gate electrode from being undesirably brought into contact with the semiconductor unit by the electrostatic attractive force.

I claim:

1. A semiconductor acceleration sensor comprising:

a trench provided in a main surface of a semiconductor substrate, said trench having a first inner wall, a second inner wall opposing said first inner wall, and a third inner wall joining said first inner wall and said second inner wall;

a gate electrode of an electroconductive material, said gate electrode facing said first inner wall, said second inner wall and said third inner wall of said trench via an air gap;

a first semiconductor unit formed in said first inner wall and consisting of three adjoining semiconductor layers for detecting a displacement of said gate electrode relative to said first semiconductor unit induced by an applied acceleration, every adjoining pair of said three adjoining semiconductor layers of said first semiconductor layer having different conductivity types; and a second semiconductor unit formed in said second inner wall and consisting of three adjoining semiconductor layers for detecting said displacement of said gate electrode relative to said second semiconductor unit induced by said applied acceleration, every adjoining pair of said three adjoining semiconductor layers of said second semiconductor layer having different conductivity types.

2. A semiconductor acceleration sensor according to claim 1, further comprising an electrically insulating film covering said first inner wall, said second inner wall, and said third inner wall.

3. A semiconductor acceleration sensor according to claim 1 or 2, wherein said first semiconductor unit extends from said first inner wall to said main surface of said semiconductor substrate and said second semiconductor unit extends from said second inner wall to said main surface of said semiconductor substrate.

4. A semiconductor acceleration sensor comprising:

a plurality of trenches provided in a main surface of a semiconductor substrate, each trench having an inner surface comprising side walls and a bottom;

a cantilever supported in said trench, an air gap dielectrically separating said cantilever from said inner walls of said trenches;

a first gate electrode of an electroconductive material provided on a first side surface of said cantilever, said air gap dielectrically separating said first gate electrode from said inner surface of a first of said trenches;

a second gate electrode of an electroconductive material provided on the other side surface of said cantilever opposite to said first side surface, said air gap dielectrically separating said second gate electrode from said inner surface of a second of said trenches;

a first semiconductor unit formed in said inner surface of said first trench, said first semiconductor unit consisting of three adjoining semiconductor layers for detecting a displacement of said first gate electrode relative to said first semiconductor unit induced by an applied acceleration, every adjoining pair of said three adjoining semiconductor layers said first semiconductor unit having different conductivity types;

a second semiconductor unit formed in said inner surface of said second trench, said second semiconductor unit consisting of three adjoining semiconductor layers for detecting said displacement of said first gate electrode relative to said second semiconductor unit induced by said applied acceleration, every adjoining pair of said three adjoining semiconductor layers of said second semiconductor unit having different conductivity types;

a third semiconductor unit formed in said inner surface of a third of said trenches, said third semiconductor unit consisting of three adjoining semiconductor layers for detecting said displacement of said second gate electrode relative to said third semiconductor unit induced by said applied acceleration, every adjoining pair of said three adjoining semiconductor layers of said third semiconductor unit having different conductivity types; and a fourth semiconductor unit formed in said inner surface of a fourth of said trenches, said fourth semiconductor unit consisting of three adjoining semiconductor layers for detecting said displacement of said second gate electrode relative to said fourth semiconductor unit induced by said applied acceleration, every adjoining pair of said three adjoining semiconductor layers of said fourth semiconductor unit having different conductivity types.

5. A semiconductor acceleration sensor comprising:

a gate electrode of a electroconductive material formed in a semiconductor substrate, an air gap dielectrically separating said gate electrode from said semiconductor substrate;

a first semiconductor unit formed in a surface of said semiconductor substrate and consisting of three adjoining semiconductor layers for detecting a displacement of said gate electrode relative to said first semiconductor unit induced by an applied acceleration, every adjoining pair of said three adjoining semiconductor layers having different conductivity types; and a potential layer formed in said semiconductor substrate and facing, one side of said gate electrode opposite to said first semiconductor unit via said air gap, said potential layer and said first semiconductor unit having an equivalent electric potential.

6. A semiconductor acceleration sensor according to claim 5, wherein said potential layer is a second semiconductor unit including three adjoining semiconductor layers, with every adjoining pair of said three adjoining semiconductor layers of said second semiconductor unit having different conductivity types.

7. A semiconductor displacement sensor comprising:

a trench provided in a main surface of a semiconductor substrate, said trench having a first inner wall, a second inner wall opposing said first inner wall, and a third inner wall joining said first inner wall and said second inner wall;

a gate electrode of an electroconductive material, said gate electrode facing through an air gap, said first inner wall, said second inner wall and said third inner wall of said trench;

a first semiconductor unit formed in said first inner wall and consisting of three adjoining semiconductor layers for detecting a displacement of said gate electrode relative to said first semiconductor, every adjoining pair of said three adjoining semiconductor layers of said first semiconductor unit having different conductivity types; and a second semiconductor unit formed in said second inner wall and consisting of three adjoining semiconductor layers for detecting a displacement of said gate electrode relative to said second semiconductor unit, every adjoining pair of said three adjoining semiconductor layers of said second semiconductor unit having different conductivity types.

* * * * *